March 14, 1944.　　　F. L. JONES　　　2,344,250
TRANSMISSION FILMS FOR GLASS
Filed June 13, 1941

FRANK L. JONES
INVENTOR
BY
ATTORNEYS

Patented Mar. 14, 1944

2,344,250

UNITED STATES PATENT OFFICE 2,344,250

TRANSMISSION FILM FOR GLASS

Frank L. Jones, Brighton, N. Y., assignor to Bausch & Lomb Optical Company, Rochester, N. Y., a corporation of New York Application June 13, 1941, Serial No. 397,938

6 Claims. (Cl. 88—1)

The invention relates to the treatment of glass as well as to glass articles produced by such treatment. More particularly, my invention is concerned with increasing the light transmitting ability of glass by the use on the surfaces thereof of transmission films which owe their effectiveness to the interference of light.

An object of the invention is to provide an improved process for increasing the light transmission of low refractive index glasses which have one or more monovalent alkaline oxides in their composition while an equally important object resides in the provision of an improved article having a transmission film on the surfaces thereof.

Another object of my invention is to subject a glass surface to several different stages of chemical treatment whereby to improve the light transmission of the glass so treated. A further object is to provide a process of the character decribed wherein silver atoms are employed to displace the positive element of certain oxides, normally found in glass, from a surface layer of a glass article and wherein acid soluble oxides are removed from such a layer by leaching the article with an acid.

With these and other objects in view which may be incident to my improvements, the invention consists in the procedure and the article of manufacture to be hereinafter set forth and claimed with the understanding that the specific method steps, the particular reactants and the several necessary elements of the article may be widely varied in occurrence, proportion and construction without departing from the spirit of the invention or exceeding the scope of the appended claims.

In order to make my invention more clearly understood, I have shown in the accompanying drawing a manner for carrying the same into practical effect without limiting the improvements in their useful applications to the particular constructions which, for the purpose of explanation, have been made the subject of illustration. With special reference to the different views.

Figure 1:
Figure 1 is a diagrammatic illustration, in partial sectional elevation, of a glass article.

It is well recognized that the light transmission of glass may be materially increased by providing transmission or anti-reflection films on its surfaces. One practice for forming a film of this nature on a glass article comprises immersing the article in a solvent or leaching agent which will leach out or dissolve certain materials of the glass and leave a surface film on the article which is rich in silica and which is of a depth equal to the optical thickness desired for the transmission film.

The common glasses are understood to be made up of a random network of strongly bonded silicon and oxygen atoms with other elements joined to the basic network through oxygen linkages. Under present theory, formation of surface films on the glass is possible because the less strongly bonded elements can enter into chemical reactions without damage to the silica network. For example, when a silicate glass is treated with a water solution of any acid, it appears that the acid soluble atoms leave the glass and go into solution while hydrogen ions, in some cases at least, replace the metal ions forming a partially hydrated silica film on the surface of the glass. Removal of these acid soluble oxides is influenced to varying degrees by such factors as the type of glass being treated, the kind of acid employed, the concentration of the acid solution, the time of treatment and the temperature at which the treatment is carried out. Suitable control of these factors so as to cause the acid treatment to produce a surface film of a desired optical thickness is well understood by the art.

I have found, however, that the light transmission of certain glasses may be made of even greater magnitude than that heretofore obtained by the practice just described, if these glasses are subjected to special surface conditioning prior to the acid treatment used in the formation of a transmission film. As at present understood, this discovery depends upon the use of a metallic element which will chemically react with glass to displace and which will be substituted for monovalent alkaline elements attached to the network of silicon and oxygen atoms of the glass by oxygen linkages. The displacement of monovalent alkaline elements by such a metallic element is allowed to proceed until the metallic element appears to have penetrated the glass to a depth sufficient to form a surface layer on the body of the glass of a thickness greater than the optical thickness desired for the transmission film, after which the glass is subjected to acid treatment to leach the desired film.

The invention comprehends the treatment of any glass which has one or more monovalent alkaline oxides in its composition, such as the oxides of sodium, potassium and lithium, although there are comparatively few glasses which contain the latter element. Generally glasses of this nature are characterized by having relatively low refractive indices. While all such glasses may be treated by the process of my invention to give improved light transmission over prior art methods, it would seem that the greater the percentage of monovalent alkaline oxides present in a glass of this character, the greater will be the gains in its transmission as compared with processing practices heretofore used. For this reason, the invention is particularly adapted to the treatment of crown glass, especially the crowns of the soda-lime-silica type and the borosilicate crowns.

In accordance with this theory, I make use of the strong affinity of silver for silica in displacing the monovalent alkaline elements and react a silver salt with glass to cause silver atoms to penetrate the glass to a desired depth to form a surface layer in which silver atoms have displaced alkaline elements. While silver atoms, as a result of their diffusion into the body of the glass, rather than alkalies, are now connected to the glass molecule by oxygen linkages, the bivalent alkali earth elements and in fact all of the elements loosely joined to the silicon-oxygen network of the glass remain unaffected by this reaction with, of course, the exception of the monovalent alkaline elements. The result of the penetration of the silver atoms into the glass is to create a layer on the surface thereof which while having a different composition from the body of the glass, has a higher refractive index and is still formed of acid soluble oxides of a nature susceptible to the leaching action of an acid so as to permit formation of a transmission film on the glass. Included in the acid soluble oxides are, of course, silver oxides resulting from the diffusion reaction.

Suitable practice for conditioning the surface of a glass article such as that indicated by the reference numeral 10 in Figure 1, comprehends applying a fused silver salt to the surface of the article. The affinity of silver for the silica of the glass seems so strong that any organic or inorganic silver salt which will melt at a temperature below the softening point of the glass and which will not decompose below 100° C. may be suitably employed to carry out the desired reaction. For example, silver nitrate, with which I have had considerable success, admirably fulfills the requirements for a salt.

Figure 2:
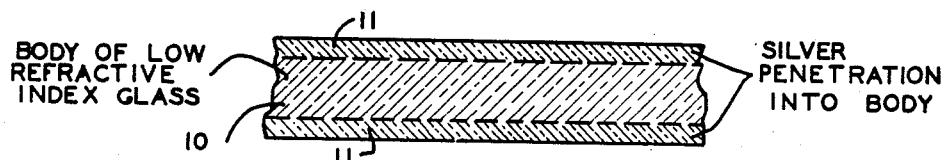
Figure 2 is a view similar to Figure 1 and shows the glass article after partial completion of its processing in accordance with my invention.

Any one of several different practices may be used for applying the fused salt to the glass. The silver salt may be melted in a suitable vessel and a glass article may be immersed in the molten salt to permit silver atoms to penetrate the surfaces thereof to a desired depth as indicated in Figure 2 wherein there is shown an article having silver treated surface layers 11 which are exaggerated in thickness for the purpose of illustration. Following formation of the silver layers, the article may be cooled and cleaned of excess silver after which it is subjected to leaching with an acid, although it is not essential that the glass be at any particularly lowered temperature before it is leached.

Another practice incorporates a powdered silver salt, as by mixing, with some suitable organic vehicle, for example petroleum jelly. This mixture is evenly spread or coated on the glass surfaces to be treated and the article is then baked at a temperature which will fuse the salt. The baking continues at a suitable temperature for a time sufficient to allow the salt to penetrate the glass to the depth desired for the surface layer. Where the silver salt after being placed on an article is fused by baking, the expedient of incorporating it in a carrier not only assists its even distribution and aids in obtaining an even surface treatment for the surface undergoing processing but also permits at will of treatment of only part of a surface. The glass article after suitable cleaning following this treatment is ready for filming by an acid solution.

It is possible to lower the melting point of a silver salt by mixing it with several other salts which will not react with glass. For example, a mixture of potassium nitrate, sodium nitrate and silver nitrate may be made which will have a melting point considerably lower than that of silver nitrate. Obviously, practice of this nature will permit the use of a number of silver salts, the melting points of which are normally higher than the softening points of glasses of the types described. At the same time, this practice will simplify general handling and processing operations involved in carrying out my invention. It is to be observed that a salt mixture of the character described is susceptible to use when incorporated in an organic carrier in the manner previously explained or it may be used as a molten bath into which the glass article may be dipped.

The reaction between the silver salt and the glass is carried out at any suitable temperature between the fusing point of the salt or the salt mixture employed and the softening point of the particular glass being treated. This reaction under the heretofore described theory is allowed to proceed until silver atoms have penetrated into the glass to a desired depth. The silver treated surface layer should be of a thickness which will exceed the thickness of the transmission film so that on the removal of the silver oxides in the formation of such film, a surface layer comprised of two sections will be provided. One section, which is adjacent to the body of the glass so treated, contains silver oxides while the other section, which is superposed on the first section, is formed of a silica transmission film equal in thickness to that desired for the particular transmission film.

The time and temperature of treatment of the glass with the silver salt or salt mixture is a factor in determining the depth of the silver treated surface layer. For example, surface layers of different suitable thickness would seem to be formed under any of the foregoing practices by treatments ranging from greater than 1 minute to less than 100 minutes at 300° C. For lower temperatures, the treating time is greater while for higher temperatures it is less. In general, any glass of the character noted will have a silver treated surface layer provided thereon of a thickness suitable to permit formation of a transmission film which will improve the transmission of light within the visual range of the spectrum, when such glass is subjected to one of the described treatments with a silver salt or salt mixture at fusion temperature for approximately 30 minutes.

No substantial gain in light transmission over that obtained with the usual silica film is to be expected where the surface of a glass article is conditioned with a silver salt or salt mixture for a minute or less before being subjected to acid treatment. Silver salt treatment for 100 minutes or longer can be expected to discolor the glass by causing it to first become a faint yellow which deepens into a brown on continued treatment beyond this period. Also, as it is well known, prolonged maintenance of glass at relatively high temperatures in an oxidizing atmosphere will cause discoloration to occur where a surface of such glass has been previously conditioned in the manner disclosed. Discoloration may be readily prevented by carrying out the silver salt treatment within the time range disclosed, by cooling the glass following such treatment and by avoiding subsequent subjection of the glass to dangerous temperatures.

A glass article which has been penetrated by silver atoms would seem to comprise a body portion of a normal structure and also a surface layer which contains acid soluble oxides on at least one surface of the body. Such an article is disclosed in Figure 2 where the reference numeral 10 represents the body of the article which is shown with surface layers 11 on its top and bottom surfaces. Hence it will be apparent that a silica film may be formed on the surface layer through the use of the leaching practices ordinarily employed to provide transmission films upon untreated glass surfaces.

Any aqueous acid solution, inorganic or organic, may be used for this purpose assuming that the surfaces to be filmed are suitably clean and are free of any accidentally formed silica film. Certain acids, however, do have a speedier reaction than others. For example, for glasses of the type treated by my method, hydrochloric acid is quicker acting than sulphuric acid while nitric acid will cause film formation at a slower rate than sulphuric. A similar condition exists for organic acids although in general these are slower in their reaction speed than the inorganic acids. I have found that filming of the described glasses proceeds at the best rate when an aqueous solution of hydrochloric acid is employed. Commercial hydrochloric acid has been found quite satisfactory when used in a solution consisting of 50% acid by volume and 50% water by volume.

Figure 3:
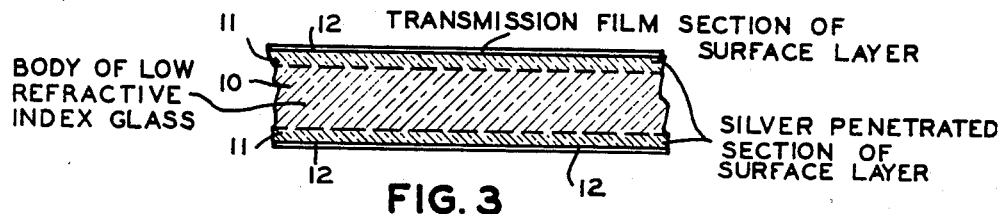
Figure 3 is a diagrammatic illustration also like that of Figure 1 but shows an article which has been completely treated by my process.

As indicated, the leaching out of the acid soluble compounds is carried on in the usual manner by immersing the glass article in a leaching agent which is generally heated to speed up the resulting chemical reaction. Good working temperatures for the described hydrochloric acid solution are around 95° C. Control of the reaction to obtain a film of the desired thickness, as already mentioned, is well understood. After treatment with the silver salt or salt mixture and following the leaching step, there is provided the glass article disclosed in Figure 3 which in accordance with the explanation heretofore detailed comprises the body 10 of the same chemical composition as that possessed by the glass prior to processing but on which body there has been formed one or more surface layers which differ from the body by the partial removal of certain compounds normally contained in the body and by the substitution of silver for the positive element of other compounds normally contained in the body.

It is to be noted that each surface layer as shown in the drawings comprises an outer section 12 and an inner section 11, the thickness of each section being exaggerated for the purpose of clarity. Each outer or transmission film section 12 of a surface layer is of thickness necessary to provide a desired transmission film and is composed of glass like that in the body of the article but from which acid soluble oxides have been removed while each inner section 11 is of a glass characterized by having a similar structure to that of the body but in which silver atoms have been substituted for monovalent alkaline elements normally present in glass of this nature.

Regardless of the explanation for the occurrence of the described phenomena which I have discovered, although their cause may be interpreted in the light of the theory heretofore set forth, the effectiveness of the practices I have detailed for providing an improved product will be immediately appreciated by the comparison of the light transmission of glass which has been treated in accordance with the described method of the prior art and glass which has been treated by the method which I have disclosed. By way of illustration, there follow a number of specific examples of glass treatment carried out in the manner of my invention together with the transmission results obtained thereby as well as the transmission results obtained where a silica film is formed directly on the surfaces of similar glass.

Glass plates of one quarter inch thickness and having plane parallel faces were employed as samples throughout these examples. These plates were all of ordinary crown glass having an index of refraction of 1.523 and a percentage composition of monovalent alkaline oxides of around 18%. However, it is to be understood that the invention is in no wise limited to this particular glass, which is merely given by way of illustration. As already stated, the treatments herein detailed may be successfully carried out with any glass containing one or more monovalent alkaline oxides, although as it has been mentioned the lower the percentage composition of such oxides, the lower will be the gains in light transmission over the usual silica film.

Samples of crown glass of the character described are known to transmit only 91.7% of the incident light which is normal to the air-glass surfaces. This is due to a loss of light by reflection, the total loss for the two air-glass surfaces being 8.3% of the incident light. To illustrate the invention, three different glass samples of the above nature were immersed respectively for 1 minute, 10 minutes and 100 minutes in molten silver nitrate maintained substantially at 300° C. The result of this treatment was to cause silver atoms to penetrate the glass surfaces and displace monovalent alkaline elements from the body of the sample in the manner described.

Following the silver nitrate surface conditioning, each sample was immersed in a 50% aqueous solution of commercial hydrochloric acid maintained at substantially 95° C. This leaching step was continued until a transmission film was formed on the air-glass surfaces of each sample which caused the reflected light to appear of a purple color similar to that color of the light reflected by the usual silica film of quarter wavelength optical thickness formed on an unconditioned glass surface with an acid solution. Formation of a silica film of this character may be expected on glass such as that described after approximately 47 hours when treated with the aqueous acid solution as just set forth.

On testing the three samples for light transmission, it was found that the sample conditioned with silver nitrate for 1 minute transmitted 93.5% of the incident light while the transmissions of the samples immersed for 10 minutes and 100 minutes in the silver nitrate bath were both equal to 94.9% of the incident light. The gain in light transmission derived from the practice of my method over the usual acid filming will become apparent when it is considered that the transmission of a glass sample like that disclosed is raised to only 93.2% of the incident light when a silica film of quarter wavelength is formed on the unconditioned air-glass surfaces of such sample by treating it with an aqueous solution of hydrochloric acid like that described.

Penetration of silver atoms into glass following the described treatment may be shown by heating a processed article in air until it takes on a brown color. The three samples which had been treated with silver nitrate and also with the acid solution were so heated and were then ground and polished on an edge. After this, the depth to which the brown color appeared to extend inwardly from an air-glass surface in a direction normal thereto was measured with a microscope. Examination of this nature disclosed penetration of silver atoms to an average depth of 12 microns from the air-glass surfaces of the sample treated with silver nitrate for 100 minutes and to an average depth of 4 microns for the sample treated for 10 minutes. On the other hand, the sample subjected to 1 minute immersion in silver nitrate produced a layer which while visible was too thin to measure, at least under usual observation practices with a microscope and without employing any special type of illumination for the object.

In appearance, the 100 minute sample had a barely visible yellow color which was present on the completion of the silver salt treatment. While obviously, substantially no detrimental effect upon the transmission of this sample can be expected from this faint degree of color as shown by its previously mentioned high transmission value, the presence of color does serve to indicate an upper limit for the time of treatment with a silver salt. Similarly, the small transmission gain obtained over the usual silica film when a sample is treated with silver nitrate for 1 minute indicates a lower limit by showing the need for continuing the silver treatment for a longer time period.

As another illustrative example of my invention, a sample like those disclosed was immersed for 25 minutes in a melted salt bath held at around 225° C. and made up of 55% silver nitrate, 15% sodium nitrate and 30% potassium nitrate. To be noted is the lower temperature used for the bath, which temperature is made possible by the mixing of other salts with the silver nitrate. Following treatment of the just described character, the sample was immersed in an aqueous acid solution in the proportion of 50% commercial hydrochloric acid by volume to 50% water by volume, the bath being held at a temperature of around 95° C. The sample was kept in the bath until a transmission or an antireflection film of purple appearance was obtained. This required about 47 hours of the acid treatment. The light transmission of the glass sample, as a result of these treatments, was found to be 95% of the incident light.

All surfaces of an article are usually provided with a surface layer as is the case of the glass samples described. It is possible, however, to carry out my invention so that only a selected surface or certain selected surfaces will have a surface layer formed thereon. In this connection, any surface may be provided with a suitable mask adapted to prevent the silver salt or salt mixture and the acid from contacting such surface.

An important point to observe is that the surface of a glass article will not be optically damaged by my process. This permits all surfaces of an article to be ground and polished prior to subjecting them to the action of a silver salt or salt mixture and to an acid.

Wherever the terms "layer" or "surface layer" are used in the specification and claims, it is to be understood that I mean a surface condition which penetrates into the body of a glass article to a finite depth from a surface of the body as the direct result of a chemical reaction to provide a surface layer of glass on the body which has a different composition from that of the body. These terms are also used to mean and to include a layer which is divided into two sections, the chemical compositions of which differ from each other and also differ from the composition of the body as the result of the diffusion of new atoms into the body of the glass and their displacement of some element normally present in the body to provide a relatively thick surface layer on a surface of the body and the chemical reaction of a reagent with this formed layer to remove certain constituents therefrom to a desired depth from the surface of the article.

As herein used, the term surface layer is to be distinguished from a thin sheet of high refractive index glass which is provided with an acid etched transmission film on one of its faces and which has its opposite face mechanically attached, as by fusing, to a surface of a glass article formed of low refractive index glass which is of a composition different from that of the glass in the thin sheet attached thereto.

While I have indicated that my invention is well adapted for treatment of optical elements, it should be observed that its broadest aspect comprehends its use for processing any glass article. Included in the scope of the invention, merely to name a few specific uses, is the employment of films formed by my method on window glass, instrument dials, thermometers, level tubes and many other articles.

In attaining the aims and objects of my invention, it will be appreciated that not only have I devised a novel process for the formation of transmission films on certain glasses but that I have developed a process which makes possible greater gains in light transmission than would result from the formation of a silica film directly on the unconditioned surface of the described types of glass. At the same time, it will be realized that I have provided an improved product which results from simple process steps that can be readily carried out.

I claim:

1. The method of improving the optical properties of a substantially colorless glass article having a body formed of a glass which normally contains at least one monovalent alkaline oxide, image forming light rays being passed through said body, said method comprising the steps of immersing the article in a bath held at a temperature below that of the softening point of said glass and which contains a melted silver salt to cause silver atoms from the bath to replace the monovalent alkaline element of any monovalent alkaline oxide in a surface layer of the body to a depth of at least four-tenths of a micron, withdrawing the article from the bath and immersing the article in an acid bath to remove acid soluble oxides in said layer until a purple film is formed on the surface of said article.

2. The method of improving the light transmission of a colorless glass article adapted to transmit image forming light rays and formed of a glass which normally contains at least one monovalent alkaline oxide, said method comprising providing a transmission film of a desired optical thickness on the article by subjecting the article to the action of molten silver nitrate to form a surface layer thereon wherein silver atoms from the silver nitrate replace the alkaline element of any monovalent alkaline oxide to a depth from the surface of said article which is greater than said optical thickness and then leaching said article with an aqueous solution of hydrochloric acid to remove acid soluble oxides from said layer to a depth from the surface of the article substantially equal to a quarter wave length of visible light.

3. The method of producing a transmission film of a desired optical thickness on a colorless glass article adapted to transmit image forming light rays and formed of a glass which normally contains at least one monovalent alkaline oxide whereby to increase the light transmission of the article, which method comprises the steps of coating the article with a silver salt carried in an organic vehicle, baking the article to fuse said salt, subjecting the article to the action of said fused salt to cause silver atoms to replace the alkaline element of any monovalent alkaline oxide in a surface layer of a depth from the surface of the article which is greater than said optical thickness of said film, removing said coating and then leaching said article with an acid to dissolve acid soluble oxides in said layer to a depth from the surface of the article substantially equal to a quarter wave length of visible light.

4. As a new article of manufacture, a body through which image forming light rays pass, said body being formed of glass having a relatively low refractive index and normally containing at least one monovalent alkaline oxide, said body having a thin transparent surface layer extending over the body and having a composition different from that of the body, said surface layer having silver atoms in place of the alkaline element of any monovalent alkaline oxide which is a normal constituent of said body and which is present in the surface layer, and said surface layer being substantially free of acid soluble oxides from a section thereof having a thickness which is less than the thickness of the surface layer and substantially equal to a quarter wave length of visible light.

5. A substantially colorless glass article having a silica transmission film on the surface thereof whereby to increase the transmission of image forming light rays through the article, said article comprising a substantially colorless body of a glass having a relatively low refractive index and which contains at least one monovalent alkaline oxide, and a thin transparent surface layer on said body, said surface layer characterized by having a section adjacent the body in which silver atoms replace the alkaline element of any monovalent alkaline oxide normally present in the glass of the body and by having a section superposed on the first section which is rich in silica and which is substantially free of acid soluble oxides, said second section of the surface layer having a thickness which is substantially equal to a quarter wave length of visible light and less than the thickness of the first section.

6. A method of increasing the light transmission of a substantially colorless glass body through which image forming light rays are adapted to pass and which is formed of glass which normally contains at least one monovalent alkaline oxide, said method comprising the steps of subjecting a surface of said body to the action of a molten silver salt to cause silver atoms to replace the monovalent alkaline element of any monovalent alkaline oxide to a depth of at least four-tenths of a micron and then leaching the treated surface with an acid to remove acid soluble oxides until a film of purple appearance is formed.

FRANK L. JONES.